Sept. 1, 1936. J. A. WAINWRIGHT ET AL 2,052,679
PRINTING
Filed Feb. 7, 1933
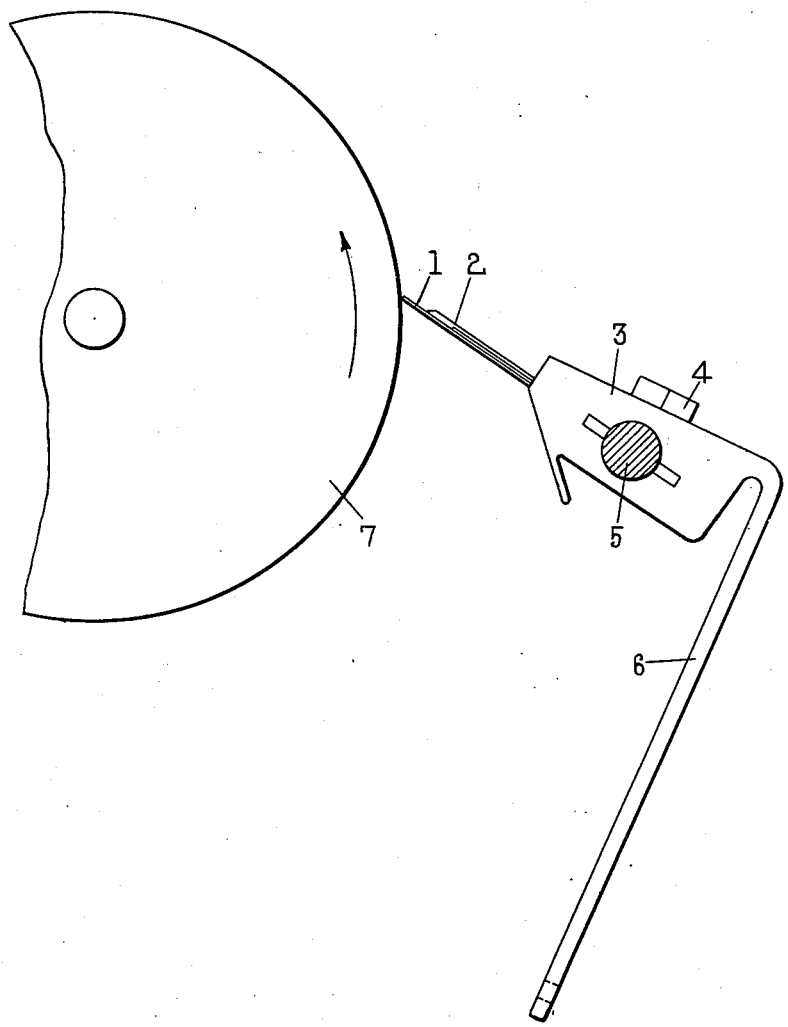
Inventors
James A. Wainright
James W. Harrop Patented Sept. 1, 1936

2,052,679

UNITED STATES PATENT OFFICE 2,052,679

PRINTING

James Arthur Wainwright and James William Harrop, Spondon, near Derby, England, assignors to Celanese Corporation of America, a corporation of Delaware Application February 7, 1933, Serial No. 655,550
In Great Britain February 13, 1932

2 Claims. (Cl. 101—169)

This invention relates to doctor-blades and scrapers.

In printing with engraved rollers or plates a composition containing the colour or other agent to be applied is frequently applied to the roller or plate and the excess composition removed from the surface by a metal doctor-blade or like scraper. It frequently happens that a component of the composition used has a corrosive action on the doctor-blade or scraper so that not only does some of the composition remain on the surface of the printing roller or plate outside the engravings, but the engraved surface is rapidly worn by the serrations in the blade.

The surprising discovery has now been made that doctor-blades and like scrapers having an operating edge made of plastic materials such for example as synthetic resin and cellulose derivative materials can be used, in place of the metal blades hitherto employed, with great advantage. Such blades are not only resistant to wear to a remarkable degree, but, owing to the relative softness of the material of which the operating edge is composed, wear of the surface which is scraped is very much reduced. Furthermore, even if the edge becomes pitted or worn, the serrations do not score the engraved surface over which the blade passes. Scrapers having an operating edge made from plastic materials possess the additional advantage that they are very readily made for example by moulding, so that replacement of worn materials is easy and economical.

According to the present invention therefore scrapers and doctor-blades have their operating edges made from a plastic material. While the whole of the scraper or doctor-blade may be made of a plastic material, it is preferred either to use plastic material in the construction of the operating edge only, or to reinforce the plastic material to within a short distance of the operating edge with a metal reinforcement. Thus for example a narrow blade of a plastic material may be moulded onto a metal structure.

Among cellulose derivative materials which may be used in the production at least of the operating edges of doctor-blades and like scrapers may be mentioned cellulose ester materials, such for example as cellulose acetate, cellulose formate, cellulose propionate, or cellulose butyrate materials, and cellulose ether materials, for example ethyl, methyl, or benzyl cellulose and inorganic derivatives of cellulose such as nitrocellulose. Cellulose ether plastics present the advantage that they are even less readily attacked by reagents than cellulose ester plastics.

The compositions employed in the production of the blade may contain any other desired substances. Thus for example plasticizers may be employed, though, in general, a large proportion of plasticizers is not advisable, since it renders the scraper too flexible. A small proportion of plasticizers may, however, be of advantage in preventing brittleness and in aiding moulding. Resins, natural or synthetic, may also be employed in conjunction with the cellulose derivative, with or without fire retardants, fillers or other suitable ingredients.

The operating edge of the scraper or doctor-blade may, moreover, be made largely or entirely of synthetic resins or like organic material, such for example as phenol-aldehyde resins, e. g. diphenylol propane-formaldehyde resins, polyhydric alcohol-polybasic acid resins such as glycerol-phthalic anhydride resins, urea- or thiourea-formaldehyde resins, or the resins obtainable by the polymerization of vinyl compounds. It is frequently of considerable advantage to employ a synthetic resin which can be hardened to an infusible insoluble state, and to employ a scraper comprising a synthetic resin in that state since such scrapers are both hard and very resistant to acids and alkalies. Doctor-blades and like scrapers the operating edges of which are made of any of the above-mentioned plastic materials may be employed where acid, neutral or alkaline substances are to be removed from the surfaces of the printing rollers. Thus for example in printing cellulose acetate with aniline black it is usual to use a comparatively acid printing paste. Such a paste readily attacks metal blades such as have hitherto been employed. A doctor-blade having a basic of cellulose acetate is much more resistant to attack by acid than a steel blade for instance, and does not wear the surface of the printing roller nearly as quickly as does a steel doctor-blade. Where strongly alkaline substances are liable to come into contact with the blade, cellulose acetate is less resistant than for example cellulose benzoate, or the cellulose ethers, and it is in general preferable to use doctor-blades comprising one of the latter compounds rather than cellulose acetate.

The scrapers of the present invention may be prepared in any desired manner. Thus for example a fibrous base may be impregnated with a solution containing for example a phenol-aldehyde resin or cellulose acetate dissolved in a volatile solvent, and the solvent evaporated. The impregnated base is then moulded to the proper dimensions.

As has already been indicated and especially where a cellulose acetate plastic is employed, the blade is preferably however supported to within a short distance, e. g. an inch or so, of its edge by a metal reinforcement or a comparatively narrow edge composed of a plastic material reinforced or not by fibrous or other filling is attached for example by moulding or riveting to a metal scraper to act as the operating edge. In this way flexibility of the blade is minimized and greater strength is obtained.

As has been indicated the doctor-blades or scrapers of the present invention are particularly adapted for removing excess materials which have been applied to surfaces for example of engraved rollers or plates used in printing. They may be employed to replace metal however for any other purpose, for example for levelling surfaces of semi-liquid or pasty material. Where organic solvents such for example as acetone are present, a blade, the edge of which comprises a synthetic resin in the infusible and insoluble state, is preferably employed.

The invention may be illustrated by reference to the accompanying drawing of a doctor-blade. The doctor-blade consists of a strip of plastic material 1 reinforced by a metal reinforcement 2. The blade is held in position by the gripper 3 which is adjusted by the screw 4. Pressure on the lever 6 causes rotation of the blade about the spindle 5 so that the blade is pressed against the printing roller 7 and removes any excess printing composition which may be adhering thereto.

What we claim and desire to secure by Letters Patent is:—

1. In a printing machine having a printing roller, a doctor-blade or scraper having a longitudinally rigid operating edge made of benzyl cellulose, means for holding said blade comprising a pivotally mounted gripper and a manually operable lever for rotating said gripper to press it against the printing roller to remove excess printing composition adhering thereto.

2. In a printing machine having a printing roller, a doctor-blade or scraper made of benzyl cellulose, a metal reinforcing element attached thereto, means for holding said blade and reinforcing member comprising a pivotally mounted gripper and a manually operable lever for rotating said gripper to press it against the printing roller to remove excess printing composition adhering thereto.

JAMES ARTHUR WAINWRIGHT.
JAMES WILLIAM HARROP.